(12) United States Patent
Mathiowetz et al.

(10) Patent No.: US 7,039,744 B2
(45) Date of Patent: May 2, 2006

(54) MOVABLE LEAD ACCESS MEMBER FOR HANDHELD FIELD MAINTENANCE TOOL

(75) Inventors: Brad N. Mathiowetz, Lakeville, MN (US); Joachim Düren, Cologne (DE); Heiner Gerken, Schortens (DE)

(73) Assignee: Fisher-Rosemount Systems, Inc., Austin, TX (US)

(*) Notice: Subject to any disclaimer, the term of this patent is extended or adjusted under 35 U.S.C. 154(b) by 269 days.

(21) Appl. No.: 10/440,441

(22) Filed: May 16, 2003

(65) Prior Publication Data

US 2004/0039458 A1 Feb. 26, 2004

Related U.S. Application Data

(63) Continuation-in-part of application No. 10/097,084, filed on Mar. 12, 2002, now Pat. No. 6,629,059.

(51) Int. Cl.
*G06F 13/42* (2006.01)
*G06F 13/36* (2006.01)

(52) U.S. Cl. .................. 710/305; 710/705
(58) Field of Classification Search .......... 710/305, 710/105
See application file for complete search history.

(56) References Cited

U.S. PATENT DOCUMENTS

| | | | |
|---|---|---|---|
| 3,955,132 A | 5/1976 | Greenwood | 323/15 |
| 4,337,516 A | 6/1982 | Murphy et al. | 364/551 |
| 4,630,265 A | 12/1986 | Sexton | 370/86 |
| 4,635,214 A | 1/1987 | Kasai et al. | 364/551 |
| 4,707,796 A | 11/1987 | Calabro et al. | 364/552 |
| 4,954,923 A | 9/1990 | Hoeflich et al. | 361/111 |
| 4,964,125 A | 10/1990 | Kim | 371/15.1 |
| 4,988,990 A | 1/1991 | Warrior | 340/25.5 |
| 5,005,142 A | 4/1991 | Lipchak et al. | 364/550 |
| 5,103,409 A | 4/1992 | Shimizu et al. | 364/556 |
| 5,113,303 A | 5/1992 | Herres | 361/45 |
| 5,148,378 A | 9/1992 | Shibayama et al. | 364/571.07 |
| 5,150,289 A | 9/1992 | Badavas | 364/154 |
| 5,197,328 A | 3/1993 | Fitzgerald | 73/168 |
| 5,426,774 A | 6/1995 | Banerjee et al. | 395/575 |
| 5,434,774 A | 7/1995 | Seberger | 364/172 |
| 5,442,639 A | 8/1995 | Crowder et al. | 371/20.1 |
| 5,469,156 A | 11/1995 | Kogure | 340/870.38 |
| 5,481,200 A | 1/1996 | Voegele et al. | 324/718 |
| 5,570,300 A | 10/1996 | Henry et al. | 364/551.01 |

(Continued)

FOREIGN PATENT DOCUMENTS

WO WO/96/12993 5/1996

(Continued)

OTHER PUBLICATIONS

"HART Communicator," Asset Management Solutions, Fisher-Rosemount, Bulletin 62.1: Communicator, Jan. 2001, pp. 1-7.

(Continued)

*Primary Examiner*—Rehana Perveen
*Assistant Examiner*—Christopher Daley
(74) *Attorney, Agent, or Firm*—Westman, Champlin & Kelly, P.A.

(57) ABSTRACT

A handheld communication and diagnostic tool is provided. The tool is usable with process industry standard protocols having varying physical layers. Each physical layer includes at least one distinct lead. To facilitate proper loop connections, the tool includes a movable lead access member that allows connection to leads for the first physical layer, while obstructing access to leads for the second physical layer.

13 Claims, 7 Drawing Sheets

U.S. PATENT DOCUMENTS

| | | | |
|---|---|---|---|
| 5,573,032 A | 11/1996 | Lenz et al. | 137/486 |
| 5,598,521 A | 1/1997 | Kilgore et al. | 395/326 |
| 5,623,605 A | 4/1997 | Keshav et al. | 395/200.17 |
| 5,665,899 A | 9/1997 | Willcox | 73/1.63 |
| 5,742,845 A | 4/1998 | Wagner | 395/831 |
| 5,752,249 A | 5/1998 | Macon, Jr. et al. | 707/103 |
| 5,764,891 A * | 6/1998 | Warrior | 710/72 |
| 5,828,567 A | 10/1998 | Eryurek et al. | 364/184 |
| 5,838,187 A | 11/1998 | Embree | 327/512 |
| 5,909,368 A | 6/1999 | Nixon et al. | 364/131 |
| 5,923,557 A | 7/1999 | Eidson | 364/471.03 |
| 5,940,290 A | 8/1999 | Dixon | 364/138 |
| 5,956,663 A | 9/1999 | Eryurek | 702/183 |
| 5,960,214 A | 9/1999 | Sharpe, Jr. et al. | 395/835 |
| 5,970,430 A | 10/1999 | Burns et al. | 702/122 |
| 5,980,078 A | 11/1999 | Krivoshein et al. | 364/131 |
| 5,995,916 A | 11/1999 | Nixon et al. | 702/182 |
| 6,017,143 A | 1/2000 | Eryurek et al. | 364/148.06 |
| 6,023,399 A | 2/2000 | Kogure | 364/23 |
| 6,026,352 A | 2/2000 | Burns et al. | 702/182 |
| 6,047,222 A | 4/2000 | Burns et al. | 700/79 |
| 6,052,655 A | 4/2000 | Kobayashi et al. | 702/184 |
| 6,091,968 A | 7/2000 | Koohgoli et al. | 455/557 |
| 6,094,600 A | 7/2000 | Sharpe, Jr. et al. | 700/19 |
| 6,098,095 A * | 8/2000 | Nelson et al. | 709/208 |
| 6,111,738 A | 8/2000 | McGoogan | 361/91.5 |
| 6,119,047 A | 9/2000 | Eryurek et al. | 700/28 |
| 6,179,964 B1 | 1/2001 | Begemann et al. | 162/198 |
| 6,192,281 B1 | 2/2001 | Brown et al. | 700/2 |
| 6,195,591 B1 | 2/2001 | Nixon et al. | 700/83 |
| 6,211,623 B1 | 4/2001 | Wilhelm et al. | 315/224 |
| 6,236,334 B1 | 5/2001 | Tapperson et al. | 340/825.37 |
| 6,263,487 B1 | 7/2001 | Stripf et al. | 717/1 |
| 6,270,920 B1 | 8/2001 | Nakanishi et al. | 429/163 |
| 6,298,377 B1 | 10/2001 | Hartikainen et al. | 709/223 |
| 6,304,934 B1 | 10/2001 | Pimenta et al. | 710/129 |
| 6,307,483 B1 | 10/2001 | Westfield et al. | 340/870.11 |
| 6,317,701 B1 | 11/2001 | Pyotsia et al. | 702/188 |
| 6,324,607 B1 | 11/2001 | Korowitz et al. | 710/102 |
| 6,356,191 B1 | 3/2002 | Kirkpatrick et al. | 340/501 |
| 6,370,448 B1 | 4/2002 | Eryurek | 700/282 |
| 6,377,859 B1 | 4/2002 | Brown et al. | 700/79 |
| 6,397,114 B1 | 5/2002 | Eryurek et al. | 700/51 |
| 6,434,504 B1 | 8/2002 | Eryurek et al. | 702/130 |
| 6,444,350 B1 | 9/2002 | Toya et al. | 429/90 |
| 6,449,574 B1 | 9/2002 | Eryurek et al. | 702/99 |
| 6,473,710 B1 | 10/2002 | Eryurek | 702/133 |
| 6,487,462 B1 | 11/2002 | Reeves | 700/73 |
| 6,505,517 B1 | 1/2003 | Eryurek et al. | 73/861.08 |
| 6,519,546 B1 | 2/2003 | Eryurek et al. | 702/130 |
| 6,532,392 B1 | 3/2003 | Eryurek et al. | 700/54 |
| 6,539,267 B1 | 3/2003 | Eryurek et al. | 700/51 |
| 6,594,603 B1 | 7/2003 | Eryurek et al. | 702/104 |
| 6,594,621 B1 | 7/2003 | Meeker | 702/185 |
| 6,598,828 B1 | 7/2003 | Fiebick et al. | 244/118.1 |
| 6,601,005 B1 | 7/2003 | Eryurek et al. | 702/104 |
| 6,611,775 B1 | 8/2003 | Coursolle et al. | 702/65 |
| 6,615,149 B1 | 9/2003 | Wehrs | 702/76 |
| 6,629,059 B1 * | 9/2003 | Borgeson et al. | 702/183 |
| 6,654,697 B1 | 11/2003 | Eryurek et al. | 702/47 |
| 6,697,681 B1 | 2/2004 | Stoddard et al. | 700/17 |
| 6,714,969 B1 | 3/2004 | Klein et al. | 709/219 |
| 6,775,271 B1 | 8/2004 | Johnson et al. | 370/352 |
| 6,851,612 B1 * | 2/2005 | Iasso et al. | 235/472.01 |
| 2001/0053065 A1 | 12/2001 | Cudini et al. | 361/728 |
| 2002/0004370 A1 | 1/2002 | Stengele et al. | |
| 2002/0065631 A1 | 5/2002 | Loechner | |
| 2002/0077711 A1 | 6/2002 | Nixon et al. | |
| 2002/0123864 A1 | 9/2002 | Eryurek et al. | |
| 2003/0023408 A1 | 1/2003 | Wight et al. | |
| 2003/0023795 A1 * | 1/2003 | Packwood et al. | 710/105 |
| 2003/0033040 A1 | 2/2003 | Billings | 700/97 |
| 2003/0158795 A1 | 8/2003 | Markham et al. | |

FOREIGN PATENT DOCUMENTS

| | | |
|---|---|---|
| WO | WO/97/21157 | 9/1997 |
| WO | WO/98/14855 | 10/1997 |
| WO | WO/98/39718 | 9/1998 |
| WO | WO/00/41050 | 7/2000 |
| WO | WO02/027418 | 4/2002 |

OTHER PUBLICATIONS

Dewey, Fieldbus Device Maintenance—Do I Need To Go To the Field Anymore?, The Instrumentation, Systems and Automation Society, ISA 2000.

Simon et al., Field Devices—Models and Their Realizations, Dec. 11-14, 2002, Industrial Technology, IEEE ICIT 2002, IEEE International Conference, vol. 1, pp. 307-312.

U.S. Appl. No. 09/384,876, filed Aug. 27, 1999, Eryurek et al.

U.S. Appl. No. 09/409,098, filed Sep. 30, 1999, Eryurek et al.

U.S. Appl. No. 09/799,824, filed Mar. 5, 2001, Rome et al.

U.S. Appl. No. 09/852,102, filed May 9, 2001, Eryurek et al.

U.S. Appl. No. 09/855,179, filed May 14, 2001, Eryurek et al.

U.S. Appl. No. 10/790,627, filed Mar. 6, 2003, Mathiowetz.

U.S. Appl. No. 10/438,386, filed Mar. 1, 2004, Mathiowetz et al.

U.S. Appl. No. 10/440,047, filed May 16, 2003, Kantzes et al.

U.S. Appl. No. 10/426,894, filed Apr. 30, 2003, Duren et al.

U.S. Appl. No. 10/438,401, filed May 16, 2003, Opheim et al.

U.S. Appl. No. 10/440,434, filed May 16, 2003, DelaCruz et al.

U.S. Appl. No. 10/435,819, filed May 12, 2003, Kantzes et al.

U.S. Appl. No. 10/440,048, filed May 16, 2003, Duren et al.

U.S. Appl. No. 10/440,444, filed May 16, 2003, Mathiowetz et al.

U.S. Appl. No. 10/439,660, filed May 16, 2003, Mathiowetz et al.

U.S. Appl. No. 10/439,764, filed May 16, 2003, Mathiowetz.

U.S. Appl. No. 10/310,703, filed Dec. 5, 2002, Zielinski et al.

U.S. Appl. No. 10/440,041, filed May 16, 2003, Mathiowetz et al.

U.S. Appl. No. 10/440,441, filed May 16, 2003, Mathiowetz et al.

"Fluke 179 Multimeter & ToolPak Combo Pack, "http://www.fluke.com/MULTIMETER/TOOLPAK.ASP?AGID=6&SID=260 (2 pages).

"Multifunction PDA Calibrator Transmation Model 3-PMF1," Transmation, Apr. 2001.

"AAPA 60 & 90 Series Multimeter," http://www.appatech.com/a-60new.htm (5 pages).

"Fieldbus Standard for Use in Industrial Control Systems Part 2: Physical Layer Specification and Service Definition", ISA-S50.02-1992, pp. 1-93.

Hart Communications, Technical Information, Part 4 Communications, Samson, Frankfurt.

"Fieldbus Brings Protocol to Process Control," Santori et al., IEEE Spectrum, vol. 33, Issue 3, Mar. 1996, pp. 60-64.

"Computerized Maintenance systems-an Overview of Two Basic Types for Field Devices," Medlin, IEEE Pulp and Pater Industry Technical Conference, Jun. 21-25, 1999, pps. 230-232.

"Fieldbus in the Process Control Laboratory-its Time has Come," Rehg. et al., ASEE/IEEE Frontiers in Education Conference, vol. 3, Nov. 1999, pp. 13B4/12-13B4/17.

"Generic Device Description for Complex HART Field Devices," Zulkifi et al., IEE 8th International Conference on Communication Systems, vol. 2, Nov. 25-28, 2002, pp. 646-650.

"SFC Smart Field Communicator-Model STS103," Honeywell, Specification, Dec. 1995, pp. 1-4.

"SFC Smart Field Communicator-Models SFC160/SFC260," Yamatake, Specification Apr. 1999, pp. 1-6.

"Hart Communicator," Fisher-Rosemont, Product Manual, Jul. 2000, pp. i-iv, ix-x, 1-1 -140—2-1—2-8—3-1—3-38—A-1—B-1—B-6 C-1—C-4—D-1—D-4 and 1-1 1-2.

Shoji et al., Fieldbus System Engineering, 1999, Yokogawa Technical Report.

Diedrich et al., Field Device Integration in DCS Engineering Using a Device.

\* cited by examiner

US 7,039,744 B2

MOVABLE LEAD ACCESS MEMBER FOR HANDHELD FIELD MAINTENANCE TOOL

CROSS REFERENCE TO RELATED APPLICATIONS

The present application is a Continuation-in-Part Application of patent application Ser. No. 10/097,084, filed Mar. 12, 2002 now U.S. Pat. No. 6,629,059, entitled "HAND HELD DIAGNOSTIC AND COMMUNICATION DEVICE WITH AUTOMATIC BUS DETECTION."

BACKGROUND OF THE INVENTION

The present invention relates to process control and measurement. More specifically, the present invention relates to a handheld diagnostic and communication device for use in conjunction with process control measurement systems.

Handheld communicators are known. One example of such a communicator is the Model 275 Highway Addressable Remote Transducer (HART®) communicator. The HART communicator is a handheld device that provides a common communication link to all HART®-compatible, microprocessor-based instruments. The HART® communicator interfaces with HART compatible devices and communicates using the Bell 202 frequency shift key (FSK) technique of providing high-frequency digital signals superimposed on a standard transmitter current loop of 4–20 mA. The HART® communicator provides a number of known diagnostic and communication functions which facilitate maintenance of the process devices. In fact, the HART® communicator can streamline regulatory documentation preparation through access to historic configuration and as found/as left data. While the HART® Model 275 communicator is recognized as a valuable asset to the maintenance of process control instrumentation, it is slightly limited in one regard. Specifically, the Model 275 can only be used in conjunction with HART®-compatible process devices. Additional tools are also available for other process industry protocols, but to date, no one has provided an effective handheld device that can be used in conjunction with process industry protocols having different physical layer specifications.

In a process control installation employing process devices communicating in accordance with varying physical layer specifications, maintenance personnel would be forced to carry protocol-specific hand-held devices to interact with each and every device of a distinct protocol. While such a situation is undesirable, the solution is either to standardize upon a single process industry protocol, or work with one set of process industry protocol devices at a time.

A handheld device that could operate on different process communication loops having differing physical specifications would facilitate the process device maintenance and allow an operator to access varying devices without the necessity of having to carry around multiple hand-held communication and diagnostic devices. One of the primary technical hurdles to building such a device is the different physical layer specifications themselves. For example, a device adapted to communicate in accordance with one physical layer specification may actually cause damage if employed upon a process control loop requiring a different specification. A device that solves the above technical hurdles and provides use for different physical layer specifications would vastly simplify the maintenance of process control devices.

For handheld diagnostic and communication devices that support two different communication protocols, it is important to prevent the connection of more than two terminals (e.g. banana jack connections) simultaneously, as well as to prevent the improper pairings of terminals from occurring (e.g. two positives when only one positive and negative is accepted). Providing a handheld diagnostic and communication device that effectively supports two different communication protocols as well as attending to the above criteria with little to no additional unit cost would be highly beneficial.

SUMMARY OF THE INVENTION

A handheld communication and diagnostic tool is provided. The tool is usable with process industry standard protocols having varying physical layers. Each physical layer includes at least one distinct lead. To facilitate proper loop connections, the tool includes a movable lead access member that allows connection to leads for the first physical layer, while obstructing access to leads for the second physical layer.

DETAILED DESCRIPTION OF THE PREFERRED EMBODIMENTS

Figure 1:
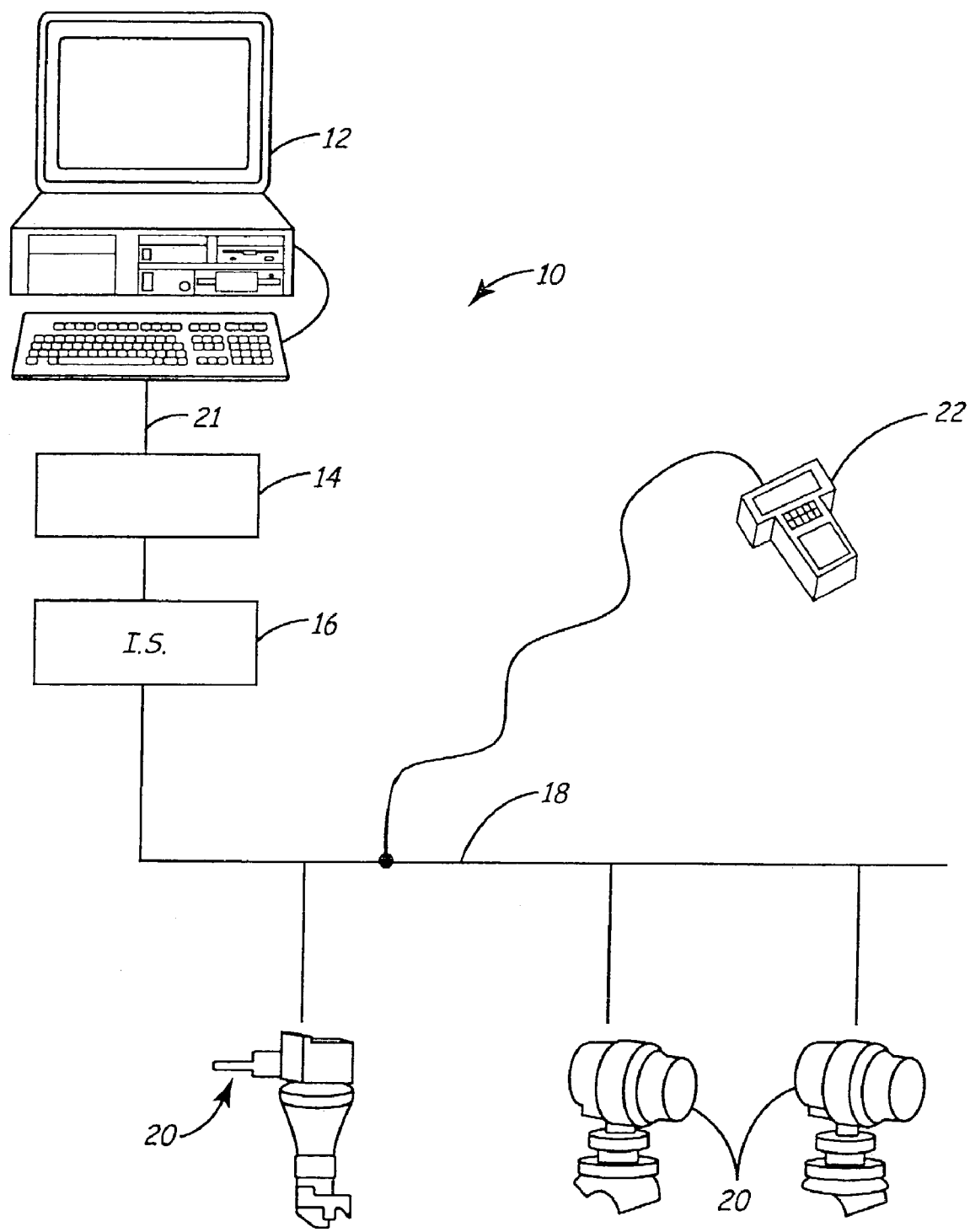
FIG. 1 is a diagrammatic view of a process measurement and control system for which embodiments of the present invention are particularly useful.

FIG. 1 illustrates an exemplary system in which embodiments of the present invention are useful. System 10 includes controller 12, I/O and control sub-system 14, intrinsic safety (IS) barrier 16, process communication loop 18 and field devices 20. Controller 12 is coupled to I/O and control sub-system 14 via link 21 which can be any suitable link such as a local area network (LAN) operating in accordance with Ethernet signaling protocols or any other suitable protocol. I/O and control sub-system 14 is coupled to intrinsic safety barrier 16 which in turn is coupled to process communication loop 18 to allow data communication between loop 18 and I/O and control sub-system 14 in a manner that limits energy passing therethrough.

In this illustration, process communication or process control loop 18 is a FOUNDATION™ fieldbus process communication loop and is coupled to field devices 20, which are shown coupled to process communication loop 18 in a multi-drop configuration. An alternative process communication (or process control) loop (not shown) is an HART® process communication loop. The HART® protocol operates using the frequency shift keying (FSK) principle, which is based on the Bell 202 communication standard. The digital signal is made up from two frequencies—1200 Hz and 2200 Hz, representing bits 1 and 0, respectively. HART® installations can be operated in so-called point-to-point configurations as well as multi-drop configurations.

FIG. 1 illustrates a multi-drop wiring configuration that vastly simplifies system wiring compared to other topologies such as the star topology. Multi-drop HART® configurations support a maximum of 15 devices, while multi-drop Fieldbus configurations support a maximum of 32 devices.

Handheld communication and diagnostic device 22 is coupled to loop 18 as illustrated in FIG. 1. It is appreciated that the example device describes a device 22 that is capable of connection to HART® or FOUNDATION™ Fieldbus loops but that device may be configured to connect to other protocols such as Profibus. When coupled to a process control loop as shown, device 22 can perform a number of the communication and diagnostic functions. In addition, device 22 can couple to and interact with an HART® process control loop (not shown) in much the same way the presently available HART® Model 275 Communicator can. In order to comply with the various different dictates of the HART® and FOUNDATION™ Fieldbus physical layer (PHY) transmit behavior, as well as complying with intrinsic safety requirements, separate network connections are provided on device 22 for HART® and Fieldbus connections.

Figure 2:
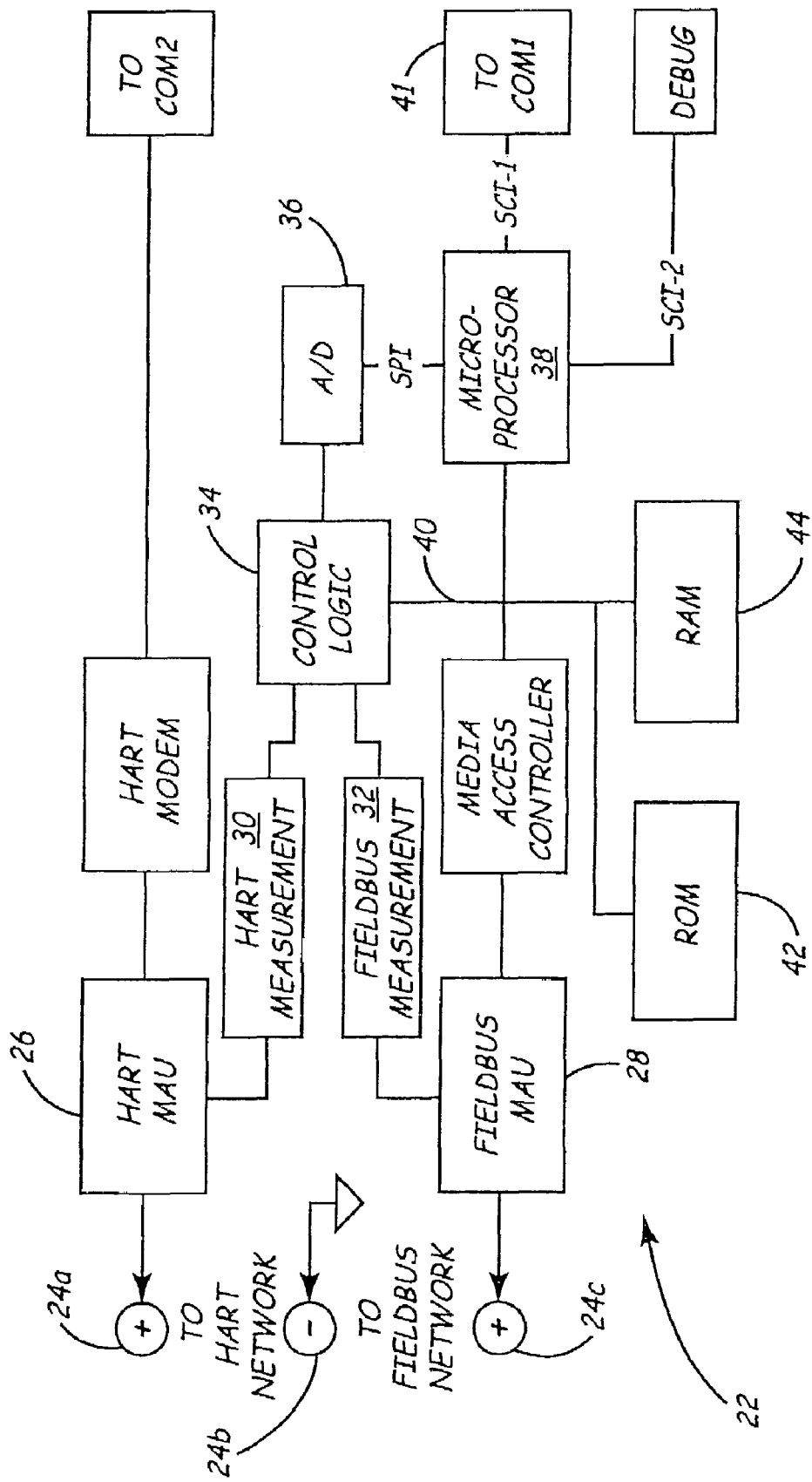
FIG. 2 is a system block diagram of a portion of a handheld communication and diagnostic device in accordance with an embodiment of the present invention.

FIG. 2 is a block diagram of a portion of device 22 in accordance with an embodiment of the present invention. Device 22 includes three network connection terminals, two positive terminals (24A, 24C) and a single common terminal (24B). Positive terminal 24A and common terminal 24B are used to coupled device 22 to an HART® network. The other positive terminal (24C) and common terminal 24B are used to connect device 22 to a FOUNDATION™ Fieldbus network. The separate network connections are used in order to facilitate compliance with intrinsic safety requirements and simultaneously comply with the different physical layer transmit behaviors of the HART® and Fieldbus protocols. Compliance with intrinsic safety requirements means compliance with one or more portions of the standard promulgated by Factory Mutual Research in October, 1998, entitled APPROVAL STANDARD INTRINSICALLY SAFE APPARATUS AND ASSOCIATED APPARATUS FOR USE IN CLASS I, II AND III, DIVISION 1 HAZARDOUS (CLASSIFIED) LOCATIONS, CLASS NUMBER 3610.

When operating with an HART® process control loop, device 22 must not sink or source a direct current (DC). To meet this requirement, the HART® physical layer circuit (also referred to as HART® MAU) 26 is designed to impose a voltage signal on process control loop 18 in the same manner that the currently available HART® Model 275 imposes such a voltage.

To meet the intrinsic safety requirement for FOUNDATION™ Fieldbus, device 22 must not inject any energy into process control loop 18. To meet this requirement, the FOUNDATION™ Fieldbus physical layer circuit (also referred to herein as Fieldbus MAU 28) will sink a DC current (preferably using a shunt current regulator, for example) of approximately 20 mA and then during message transmission, modulate that current by approximately +/−8 mA. Because the two protocols have two fundamentally different (and conflicting) ways of communicating, the circuitry of device 22 must never sink current in a HART® process control loop nor inject energy (impose a voltage) in a FOUNDATION™ Fieldbus network.

Since device 22 includes separate connections and media access circuits (26, 28) for the different process control loops, it is possible for a user to connect device 22 to the wrong network (e.g. connect HART® MAU 26 to a FOUNDATION™ Fieldbus network or vice versa). One way that device 22 deals with such a user error is by ensuring that upon initial connection, the media access units (MAU's) remain passive and do not attempt to modulate the network media.

In one embodiment, device 22 includes measurement circuits that consist of four measurement signal conditioning circuits, one for the HART® MAU (26) and three for the Fieldbus MAU 28. In addition, both HART® measurement circuit 30 and Fieldbus measurement circuits 32 have a circuit that can sink a small amplitude short duration current from the network. In this embodiment, the FOUNDATION™ Fieldbus measurement signal conditioning circuit 32 comprises three measurement conditioning circuits (collectively Fieldbus measurement circuit 32) that scale the voltage signal on the FOUNDATION™ Fieldbus network connector (24B, 24C) to measure DC voltage, communications signal amplitude, and network or loop noise. The HART® measurement circuit 30 includes a circuit to measure the DC voltage on the network. These four signal conditioning circuits all feed control logic block 34. Control logic block 34 includes a multiplexer that is connected to an analog-to-digital converter 36. Control logic block 34 is accessed by microprocessor 38 via 16-bit parallel bus 40.

In one example embodiment, when device 22 is first turned on, microprocessor 38 commands analog-to-digital converter 36 to alternately monitor the DC voltage on both the HART® and Fieldbus network connection terminals. During this state, device 22 will not disturb the network (also referred to herein as process control loop) in any way (i.e. sink/source current or impose a voltage). If there are no network connections, the voltage measured will be near zero on both loop connections. When one of the MAU terminals is connected to a loop (i.e. through connections 24A and 24B or 24C and 24B), a DC voltage will be measured on one MAU and not the other. A HART® process control loop will cause a voltage between approximately 12 and 50 volts DC to be measured while a FOUNDATION™ Fieldbus loop connection will cause a voltage between approximately 9 and 32 volts DC to be measured. The mechanical design of the loop connection terminals is selected such that it is impossible to connect both the HART® and FOUNDATION™ Fieldbus media access units (MAU) 26, 28 to a process loop at the same time. This mechanical configuration ensures that if a DC voltage is measured on one media access unit, there will not be a DC voltage on the other.

Figure 3:
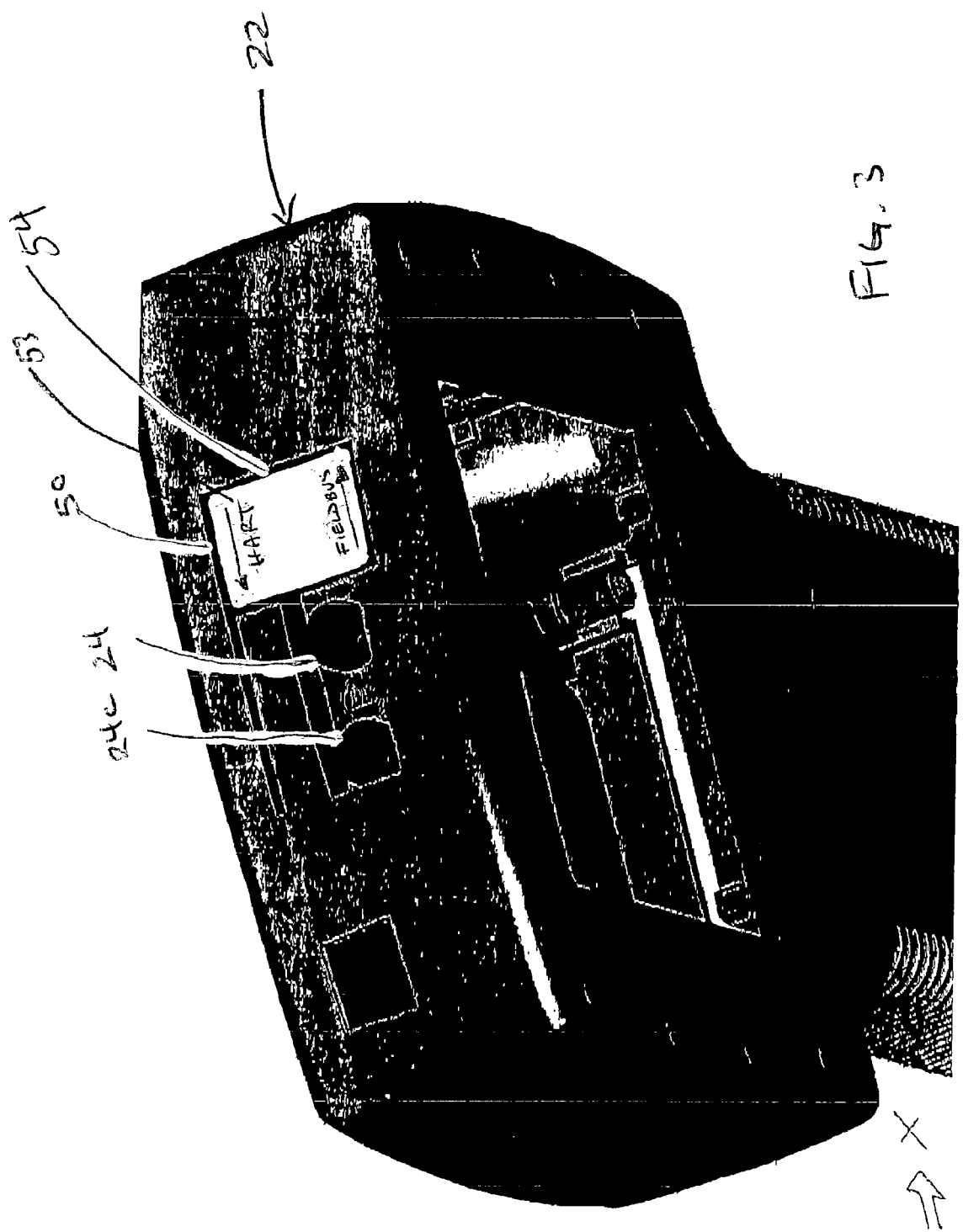
FIG. 3 is a top perspective view of a handheld diagnostic and communication device having a movable lead access member in accordance with embodiments of the present invention.
Figure 4:
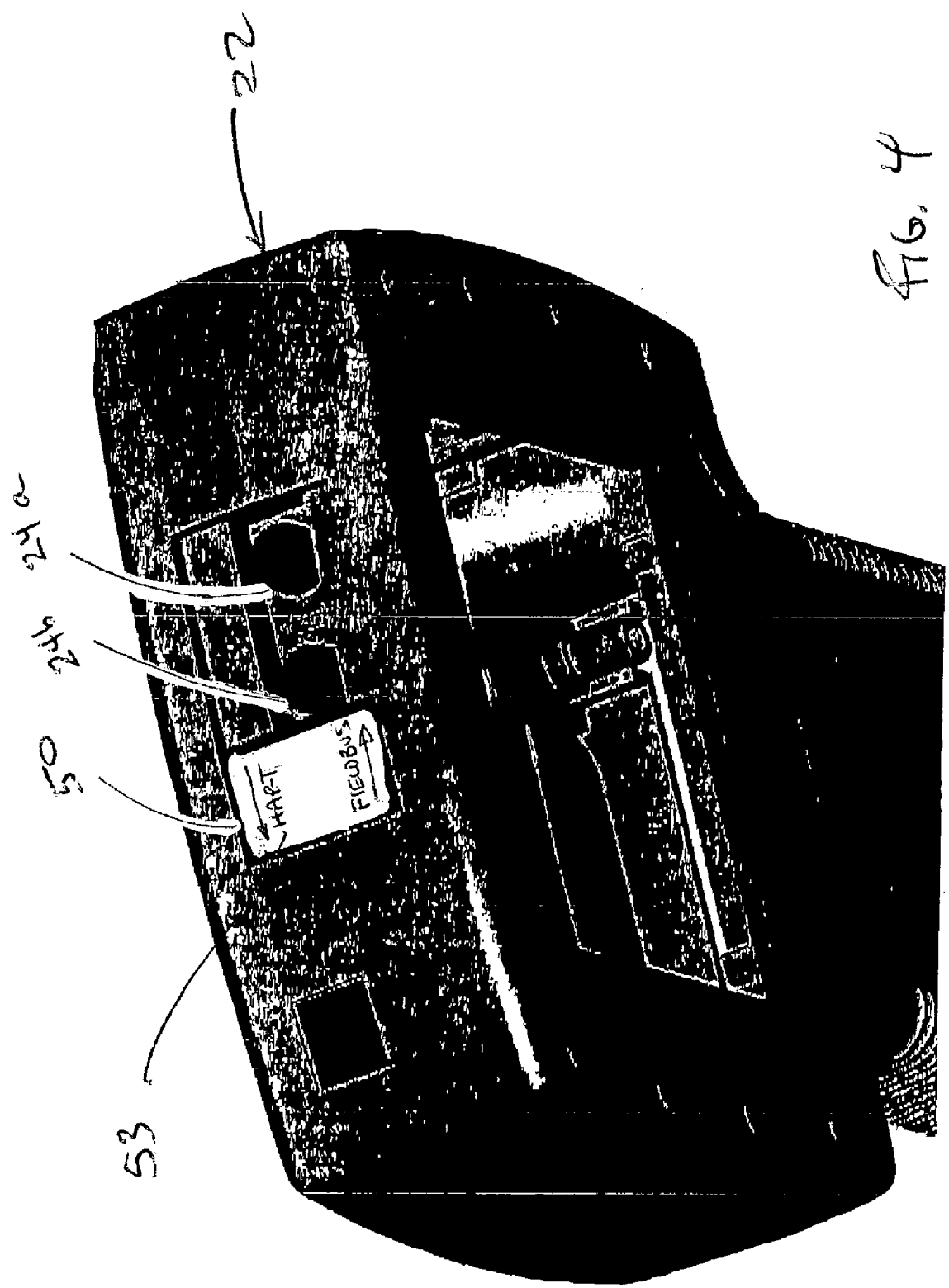
FIG. 4 is a top perspective view of a handheld diagnostic and communication device having a movable lead access member in an alternate position, in accordance with embodiments of the present invention.

FIGS. 3 and 4 are top perspective views of handheld diagnostic and communication device 22 having a movable lead access member 50 positioned in alternate positions. In FIG. 3, movable member 50 is in the form of a sliding door positioned to the far right side of its movement and abutting edge 54 within device 22. When so positioned, FOUNDATION™ Fieldbus leads 24B and 24C are exposed. Preferably, movable member 50, when embodied as a slidable door is captured within corresponding grooves on front and back halves of device 22 when device 22 is assembled. FIG. 4 illustrates movable member 50 disposed at its left-most position thereby exposing HART® leads 24B and 24A. This simple mechanical design ensures that any one time, only one pair of communication leads are accessible. This reduces the possibility that all three leads may be erroneously connected by a technician, or that, for some reason or another, leads 24A and 24C are simultaneously connected to some erroneous configuration.

Preferably, the movable member 54 has indicia 53 to indicate which protocol is to be connected. For example, as shown in FIGS. 3–4, there is HART® and Fieldbus indicia that corresponds to the position of the member. Further, member 50 may include suitable discontinuities on the surface to facilitate ease of sliding the member from one position to the other. This can be in the form of raised portions, grooves, etc.

Figure 5:
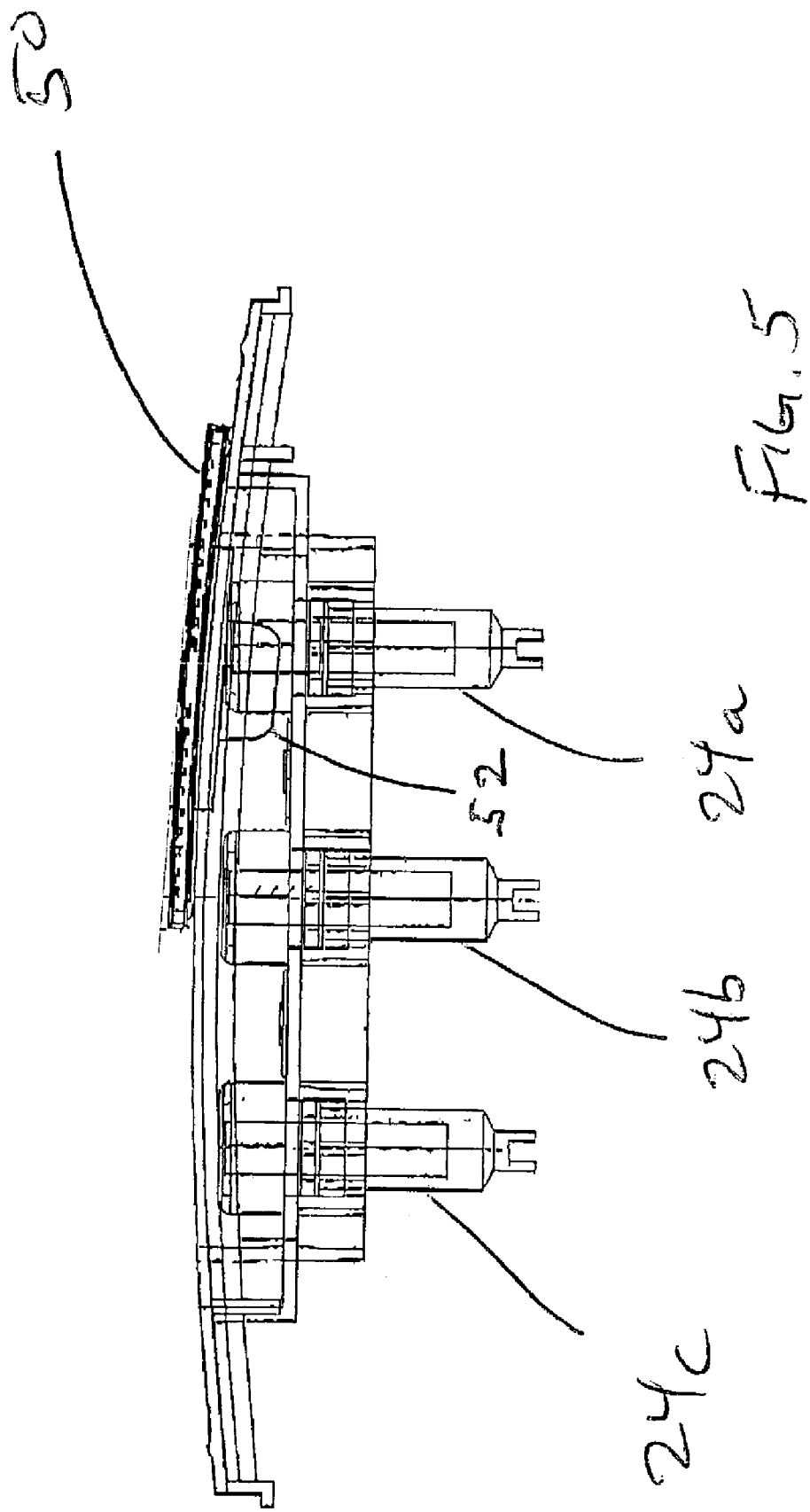
FIG. 5 is a front elevation wire view of a slidable lead access member disposed relative to three electrical lead access points in accordance with embodiments of the present invention.

FIG. 5 is a side elevation wire view of movable member 50 disposed relative to lead access points (preferably banana jacks) 24A, 24B and 24C. FIG. 5 also illustrates tab 52 extending from movable member 50 into device 22. Preferably, tab 52 is arranged to cooperate with a corresponding structure within device 22. Tab 52 can also be considered a capture mechanism. This mechanism allows the linear movement of member 50 but prevents its lateral movement. This keeps member 50 in place and prevents it from falling out when separating the front and back housing pieces of device 22. Capture mechanism 52 is preferably an extension piece on the bottom of member 50. Tab 52 is preferably sized in length, width and depth to correspond with cooperating features within device 22. The length of tab 52 preferably runs in the same direction that member 50 slides. Additionally, tab 52 also preferably sits within a groove inside tool 22, but not so tightly that movement of member 50 is prevented. In one example, the groove is created by a gap between the housing and the side of the lead access points. In this example, the width of tab 52 is smaller than the gap and the depth is selected to fit within the groove of components. Regarding the length of tab 52, it should be of sufficient length so that the extension has sufficient strength so that it will not break off when mounted with member 50.

The length of movable member 50 can also be used to prevent member 50 from being improperly inserted (e.g. inserted backwards). Solutions such as this exist when the groove is in the center, or if there are parallel grooves that exist. In the example illustrated in FIG. 5, the grooves are on both sides of the lead access points, so the latter case exists.

Movable member 50 can preferably only be inserted in the groove one way to operate properly. Member 50 is also preferably labeled and must be mounted such that the labeling is visible to a user. If member 50 is installed backwards, the user will not see labeling on member 50. To prevent this from occurring, the groove that is intended to receive tab 52 is extended, as in the length of the extension. When installed properly, member 50 will slide properly from one extreme position to the other. However, when member 50 is installed improperly, the longer extension will prevent member 50 from travelling fully and thus prevent exposure of a lead access pair. This will prevent use of the product when member 50 is installed incorrectly, and force the proper installation of member 50.

Figure 6:
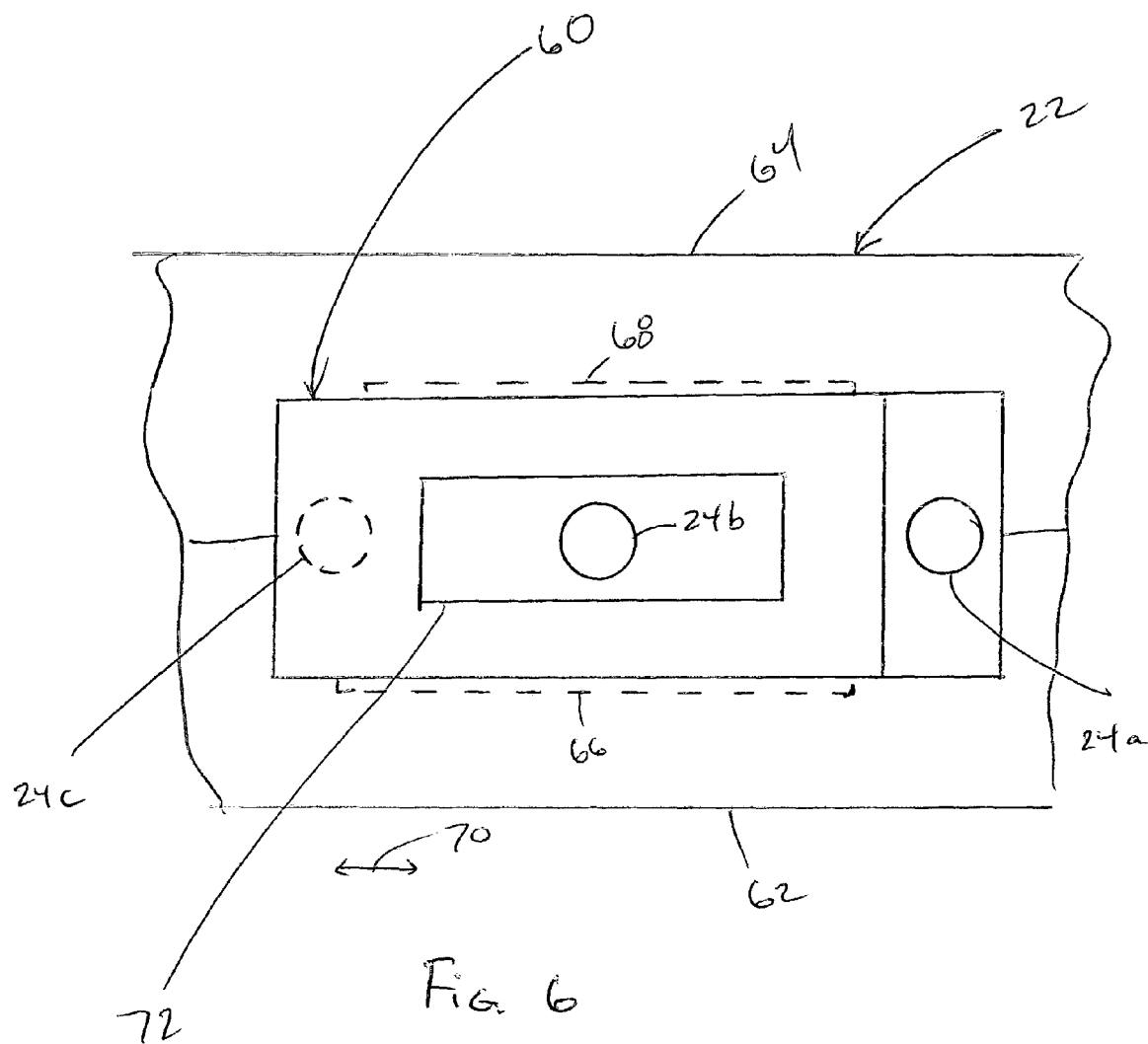
FIG. 6 is a top plan view of a movable lead access member with accordance with alternate embodiment of the present invention.

FIG. 6 is a top plan view of a movable lead access member mounted within device 22 in accordance with an alternate embodiment of the present invention. Like member 50, member 60 is preferably slidably received within front and back housing halves 62 and 64, by virtue of extension tabs 66 and 68 which are preferably received within halves 62 and 64, respectively. When so constructed, member 60 will be slidable in the direction of arrow 70. Member 60 differs from member 50 in a couple of important regards. First, member 60 fills the area of lead access points to a much greater extent than member 50. This is accomplished by creating aperture 72 within member 60 to allow access to the common lead access point 24B regardless of the position of member 60. As illustrated in FIG. 6, member 60 will generally allow access to one of lead access points 24A and 24C, while simultaneously obstructing access to the other.

Figure 7:
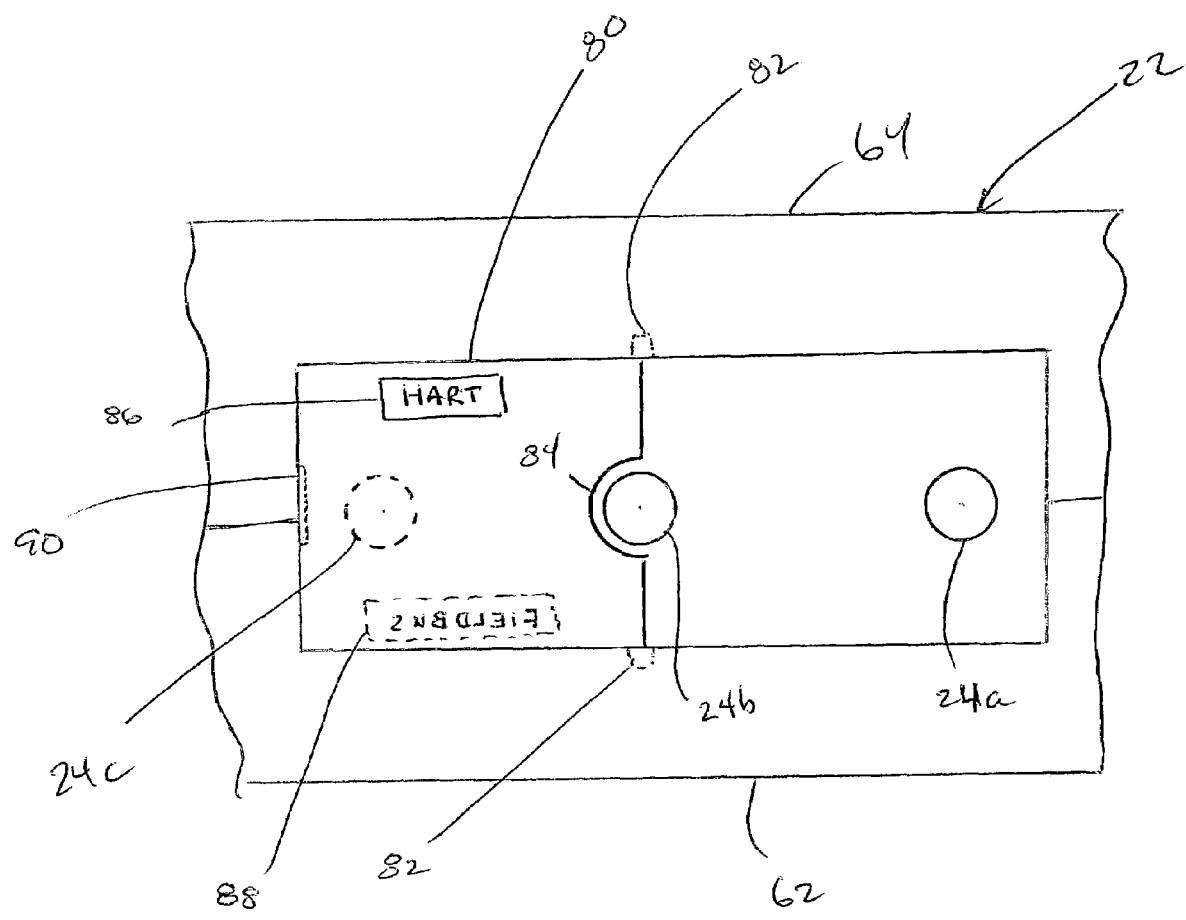
FIG. 7 is a top plan view of a movable lead access member in accordance with embodiments of the present invention.

FIG. 7 is a top plan view of a movable lead access member in accordance with another embodiment of the present invention. Member 80 differs substantially from members 50 and 60 in that member 80 does not slide within device 22. Instead, pivot extensions 82 are captured within corresponding structures in front and back halves 62, 64. When fully assembled, member 80 pivots about points 82. Member 80 includes a central cutout 84 that allows access to common terminal 24B regardless of whether member 80 is in its first position (illustrated in FIG. 7), or its second position wherein access to lead access points 24C and 24B is available. Additionally, member 80 also includes indicia 86 and 88 to indicate to a technician which protocol is suitable for connection to the accessible leads. Thus, as illustrated in FIG. 7, when lead access points 24A and 24B are exposed, indicia 86 is visible and the technician is informed that connection to a HART® network is appropriate. When member 80 is rotated about access points 82 into its alternate position (thereby exposing lead access point 24C, and obstructing lead access point 24A) indicia 88 becomes visible and the technician is informed that connection to a FOUNDATION™ Fieldbus network is appropriate. Preferably, member 80 also includes a slight cutout 90 to facilitate grasping of member 80 with a technician's tool.

Although the present invention has been described with reference to preferred embodiments, workers skilled in the art will recognize that changes may be made in form and detail without departing from the spirit and scope of the invention. For example, although embodiments of the invention were described with respect to HART® and FOUNDATION™ fieldbus networks, embodiments of the present invention are practicable with any hand held diagnostic and communication devices where two distinct type of communications or connections are possible, such as Profibus and other protocols, and where simultaneous or erroneous connections must be avoided.

What is claimed is:

1. A handheld field maintenance tool comprising:
   a first media access unit for communicating in accordance to with a first protocol;
   a first network connection point adapted to connect the first media access unit to a process control loop;
   a second media access unit for communicating in accordance to with a second protocol;
   a second network connection point adapted to connect the second media access unit to the process control loop; and
   a movable lead access member having a first position and a second position, wherein the first position allows access to the first network connection point while obstructing the second network connection point, and wherein the second position allows access to the second network connection point while obstructing access to the first network connection point.

2. The tool of claim 1, wherein the first and second network connection points share a common terminal.

3. The tool of claim 1, wherein the first and second network connection points include banana jacks.

4. The tool of claim 1, wherein the first protocol is the HART® protocol.

5. The tool of claim 4, wherein the second protocol is the FOUNDATION™ Fieldbus protocol.

6. The tool of claim 1, wherein the first protocol is the FOUNDATION™ Fieldbus protocol.

7. The tool of claim 1, wherein the movable lead access member is slidable within the tool.

8. The tool of claim 7, wherein the member includes a capture mechanism.

9. The tool of claim 8, wherein the capture mechanism is a tab extending from the member and adapted to cooperate with structure within the tool.

10. The tool of claim 7, wherein the member includes an aperture therein that allows access to a common terminal regardless of the position of the member.

11. The tool of claim 1, wherein the member is adapted to function erroneously if installed improperly.

12. The tool of claim 1, wherein the member includes indicia to facilitate a proper network connection.

13. The tool of claim 1, wherein the member is adapted to pivot between the first and second positions.

\* \* \* \* \*